United States Patent [19]

Lutz et al.

[11] Patent Number: 4,801,508
[45] Date of Patent: Jan. 31, 1989

[54] DRAFTING MATERIAL

[75] Inventors: Walter Lutz, Hochheim; Roman Keiper, Wiesbaden-Biebrich, both of Fed. Rep. of Germany

[73] Assignee: Hoechst Aktiengesellschaft, Frankfurt am Main, Fed. Rep. of Germany

[21] Appl. No.: 65,422

[22] Filed: Jun. 23, 1987

[30] Foreign Application Priority Data

Jul. 16, 1986 [DE] Fed. Rep. of Germany ....... 3623984

[51] Int. Cl.$^4$ .............................................. B32B 27/34
[52] U.S. Cl. ................................. 428/483; 428/908.8; 430/162; 524/100
[58] Field of Search .................... 428/908.8, 480, 483; 430/162; 524/100

[56] References Cited

U.S. PATENT DOCUMENTS

| | | | |
|---|---|---|---|
| 4,426,471 | 1/1984 | Berner | 524/100 |
| 4,525,521 | 6/1985 | DenHartog et al. | 524/100 |
| 4,543,316 | 9/1985 | Thoese | 430/162 |
| 4,576,981 | 3/1986 | Hilger et al. | 524/40 |
| 4,590,231 | 5/1986 | Seltzer | 524/100 |

FOREIGN PATENT DOCUMENTS

| | | |
|---|---|---|
| 93015 | 10/1972 | German Democratic Rep. . |
| 1061784 | 3/1967 | United Kingdom . |
| 1127076 | 9/1968 | United Kingdom . |
| 1209992 | 10/1970 | United Kingdom . |
| 1222727 | 2/1971 | United Kingdom . |
| 1231407 | 5/1971 | United Kingdom . |
| 1264338 | 2/1972 | United Kingdom . |
| 1394689 | 5/1975 | United Kingdom . |

Primary Examiner—Edith Buffalow
Attorney, Agent, or Firm—Foley & Lardner, Schwartz, Jeffery, Schwaab, Mack, Blumenthal & Evans

[57] ABSTRACT

The invention discloses a drafting material which comprises a plastic support having, on at least one surface, an adhesive layer, a layer of a pigmented or clear lacquer and an antistatic top layer, in which the layer of pigmented or clear lacquer contains a combination of (a) a linear aromatic polyester,
(b) a carboxylated acrylate resin,
(c) a cyclic acid amide, corresponding to the general formula I

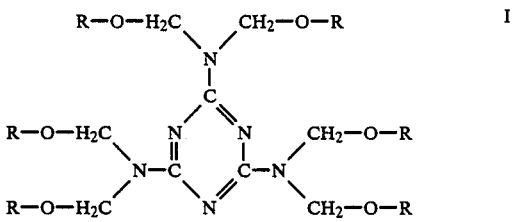

wherein R stands for an alkyl group having 1 to 4 carbon atoms, and
(d) an acid catalyst.

In the drafting material of the invention hardness, and resistance to solvents are improved.

13 Claims, No Drawings

DRAFTING MATERIAL

BACKGROUND OF THE INVENTION

The present invention relates to a drafting material which comprises a plastic support having, on at least one surface, an adhesive layer, a layer of a pigmented or clear lacquer and an antistatic top layer.

Drafting materials such as, for example, drafting films, are usually made from a plastic support of cellulose acetate, polyvinyl chloride, polypropylene or preferably polyester, in particular polyethylene terephthalate which is provided with an adhesive layer on at least one surface. The film is preferably coated with a pigmented lacquer system to produce a surface which can be marked or written on with pencil lead and india ink. The material can be equipped with a separate top layer which is applied to the layer of pigmented lacquer in order to obtain ink adherence. If a drafting film is to be used for drawing with india ink only, a transparent lacquer can be used instead of the pigmented lacquer and the top layer then contains an antistatic agent.

British Pat. No. 1,394,689 discloses a drafting material, in which a heat-curable binder system comprising polyvinyl acetate, a urea-formaldehyde or melamine-formaldehyde resin and an acid constituent is present on a polyester support, the surface of which has not been pretreated. The drafting layer adheres well to the support, but its properties with respect to writeability and ink adherence are not yet adapted to the usual technical requirements. The material does not contain an antistatic agent.

From British Pat. No. 1,222,727 a drafting layer is known, which contains a partially hydrolyzed polyvinyl lactate or glycollate as the binder, a urea-formaldehyde or melamine-formaldehyde resin as the crosslinking agent and p-toluene sulfonic acid as the catalyst. Crosslinking is performed at a temperature of 120° C. during a period of approximately 20 minutes. Such treatment is, however, somewhat problematic and produces undesirable modifications of the drafting layer and the support.

Pat. No. 93,015 of the German Democratic Republic describes a method of preparing a drafting film. According to this method, a polyester film having a pretreated surface is coated with a pigmented binder matrix comprising a combination of an acrylate, an alkyd and a melamine-formaldehyde resin. The drafting film thus produced shows good adhesion of the coating and good resistance to the action of water and light. But this film also does not have the properties expected of a good drafting film, for example, in terms of the capability of accepting india inks containing water or solvents and the solvent resistance of the coating.

In German Pat. No. 16 21 988 (equivalent to British Pat. No. 1,231,407) a transparent drafting material is described which comprises a support of polyester film and a drafting layer containing silica and/or aluminum silicate as a pigment and a cured mixture of polyvinyl alcohol, a urea-formaldehyde or melamine-formaldehyde precondensate and an acrylic acid ester as a binder. When preparing this drafting material it is a disadvantage that drying and curing must be performed in two separate operations. Another disadvantage is that the material is not sufficiently resistant when it is used for writing on with hard film marking pencils and is only slightly wetted by india ink. In addition, the antistatic properties of the material are insufficient.

The drafting material which is known from European Patent Application No. 0,119,464 (equivalent to U.S. Pat. No. 4,543,316) comprises a plastic support, at least one surface of which is coated with an adhesive layer, a layer of pigmented or clear lacquer and a top layer containing an antistatic agent. This material is not yet readily applicable to special purposes, for example, in view of solvent resistance and hardness.

SUMMARY OF THE INVENTION

It is therefore an object of the present invention to provide a drafting film which can be written on with pencil and ink or india ink and is resistant to solvents, for example, those contained in deletion fluids.

It is a further object of the invention to provide drafting layers which will not be scratched, even when using extremely hard film marking pencils.

It is yet another object of the invention to retain the favorable properties of known materials such that edges remain sharp and lines have constant widths when writing on the material with india ink and a good adhesion of the layers and characters applied is ensured.

It is another object of the invention to provide drafting materials which are antistatic and do not turn yellow during storage.

These and other objects are achieved by a drafting material of the above-mentioned kind, in which the layer of pigmented or clear lacquer contains a combination of
(a) a linear aromatic polyester,
(b) a carboxylated acrylate resin,
(c) a cyclic acid amide, correesponding to the general formula I

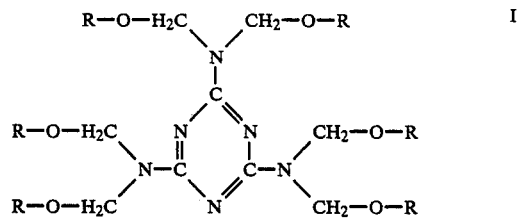

wherein R stands for an alkyl group having 1 to 4 carbon atoms, and
(d) an acid catalyst.

DESCRIPTION OF THE PREFERRED EMBODIMENTS

In a preferred embodiment the layer of pigmented or clear lacquer contains optionally an inorganic pigment, a cellulose acyl ester, an aromatic polyester, a carboxylated acrylate resin, a cyclic acid amide, and a catalytically acting quantity of acid.

As a result, a drafting material meeting ultimate requirements can be provided. The drafting material possesses good adherence of the layers to one another and to the support, good writeability and erasability, thermal stability, resistance to humidity and to the action of water, good antistatic effects, improved mechanical strength and resistance to solvents. The surface hardness of the drafting layer can be adjusted in such a manner that embrittlement of the layer does not occur and adhesion conditions are not impaired.

The combination of constituents according to the present invention, which is contained in the layer of pigmented or clear lacquer is described as follows.

The linear aromatic polyester used comprises a copolyester of isophthalic acid and terephthalic acid and at least one glycol, e.g., ethylene glycol or propylene glycol. Commercially available products are, for example, marketed under the name of Dynapol ® y Dynamit Nobel. The concentration of the polyester is in the range between 2 and 4 percent by weight, preference being given to 3.5 percent by weight, based on the total weight of the layer of pigmented or clear lacquer.

As the carboxylated acrylate resin copolymers of vinyl compounds containing free carboxyl groups with acrylic or methacrylic acid esters are employed. The particularly preferred acrylate resin has a viscosity in the range between about 700 and 750 mPa.s and an acid number between about 50 and 100, in particular from about 60 to 70. The concentration of the carboxylated acrylate resin in the layer of pigmented or clear lacquer ranges between about 30 and 50 percent by weight, preferably between about 40 and 45 percent by weight, based on the total weight of the layer of pigmented or clear lacquer.

The cyclic acid amide used comprises hexaalkyloxymethylmelamine, preferably hexamethoxymethylmelamine, which is contained in the layer of pigmented or clear lacquer in a concentration between about 10 and 20 percent by weight, preferably of about 15 percent by weight, based on the total weight of the lacquer. It has proved advantageous to treat the commercially available product Cymel ® (manufacturer American Cyanamid Co.) by high-vacuum distillation and recrystallization from petroleum ether prior to use to prevent oligomeric products from participating in the crosslinking reaction.

The linear aromatic polyester and the carboxylated acrylate resin react very rapidly in a condensation reaction with the hexaalkyloxymethylmelamine present. Carboxylated acrylate resin and aromatic polyester are appropriately used in a weight ratio of from about 15:1 to 10:1.

The reaction occurs above about 60° C. and is completed within a few minutes. The reaction is catalyzed by an acid and for this purpose a solid, strong acid, i.e., an acid having a low pH, is used, preference being given to p-toluene sulfonic acid. The acid concentration ranges from 0.5 to 3.5 percent by weight and is preferably 1.5 percent by weight, based on the total weight of the layer of pigmented or clear lacquer.

It is surprising that by substituting hexaalkyloxymethylmelamine for melamine-formaldehyde resins or corresponding precondensates, as used according to the state of the art, the rate of crosslinking is accelerated to such an extent that optimum curing of the layer is attained after a dwell time of 30 seconds in a drying line, in which temperature rises linearly from 80° C. to 120° C. When the layer of pigmented or clear lacquer is wiped over with a solvent it does not show any sign of dissolving. When writing on the layer with extremely hard film marking pencils no scratching of the layer is observed. The layer of pigmented or clear lacquer adheres excellently to the adhesive composition applied.

The combination according to the present invention which is used for the layer of pigmented or clear lacquer additionally contains a film-forming material comprised of a cellulose compound, e.g., cellulose acetate, cellulose acetate butyrate or cellulose acetate propionate, either used individually, which is preferred, or in the form of a mixture. It is also possible to use polyvinylidene chloride, polyvinyl chloride, polyvinyl acetate, polyurethane, polystyrene, polyesters and polycarbonates. The layer of pigmented or clear lacquer preferably contains a cellulose acetate propionate of medium molecular weight, which serves to optionally envelop the pigments used and is present in a concentration between about 25 and 40 percent by weight, preferably of about 35 percent by weight, based on the total weight of the layer of pigmented or clear lacquer. Care has to be taken, however, that the proportion of cellulose acetate propionate does not lead to the deterioration of hardening through the thickness of the layer.

In the case of a layer of pigmented lacquer, the layer contains, as required, aluminum oxide, aluminum silicate, titanium dioxide or silicon dioxide as an inorganic pigment. The layer preferably contains aluminum silicates.

The curable layer according to the present invention can be applied by any process customarily used for coating with such layers, for example, by means of a doctor or by roller application. Suitable solvents comprise lower alcohols and ketones, which are used either individually or in a mixture. To improve the appearance of the layer it is possible to add levelling agents, for example, polysiloxanes or a particular amount of a high-boiling solvent, e.g., methylglycol acetate. The thickness of the layer of pigmented or clear lacquer amounts to about 8 to 12 g/m$^2$, based on the layer weight.

Suitale plastic supports include those made of polyvinyl chloride, polycarbonate, polystyrene, polysulfone, polyolefin or polyester or cellulose ester, respectively. Due to their excellent dimensional stability, which is particularly important, films based on polyester, for example, polyethylene terephthalate, are preferably used.

The adhesive layers used can comprise known mixtures as disclosed, for example, in German Pat. No. 12 28 414 (equivalent to British Pat. No. 1,061,784), which consist of a mixture of the aqueous solution of a halocarboxylic acid, very finely divided silicon dioxide and wetting agents, or mixtures as disclosed in German Auslegeschrift No. 16 94 534 (equivalent to British Pat. No. 1,209,992). In addition, subbed films as described in German Auslegeschrift No. 16 29 480 (equivalent to British Pat. No. 1,127,076) and in German Auslegeschrift No. 20 34 407 (equivalent to British Pat. No. 1,264,338) can be used. Preference is, however, given to the adhesive compositions according to German Offenlegungsschrift No. 33 15 977 (equivalent to U.S. Pat. No. 4,576,981) which contain a copolymer of vinylidene chloride and a cellulose acyl ester.

The layer of pigmented a clear lacquer is additionally coated with an antistatic top layer as described, for example, in European Patent Application No. 0,119,464 (equivalent to U.S. Pat. No. 4,543,316). By means of the top layer optimum writeability with india ink is obtained and antistatic properties are imparted to the drafting film. The adherence of the top layer to the layer of pigmented or clear lacquer and the adherence of the characters applied are excellent.

The drafting material according to the present invention can also be used as a diazo-sensitized film if a light-sensitive layer, in particular a layer containing diazo chemicals, is applied. A two-component diazotype layer is, for example, comprised of a diazonium salt and a coupling component, a stabilizer and customary additives.

In the following examples the invention is explained in detail:

EXAMPLE 1

The plastic support used is a 75 μm thick film of polyethylene terephthalate, coated on both sides with an adhesive layer comprising a copolyester and a copolymer of vinylidene chloride and a cellulose acyl ester. Adhesive compositions of this type are disclosed in German Offenlegungsschrift No. 33 15 977 (equivalent to U.S. Pat. No. 4,576,981).

On top of this adhesive layer a layer of pigmented lacquer is applied, which comprises 40 percent by weight of aluminum silicate, 30 percent by weight of a carboxylated acrylate resin (Surcol® 836W, manufacturer Allied Colloid), 20 percent by weight of cellulose acetate propionate (content of propionyl 45%, viscosity 200 mPa.s according to DIN 530 15), 3 percent by weight of an aromatic copolyester (Dynapol® LH 812, manufacturer Dynamit Nobel), 8 percent by weight of hexamethoxymethylmelamine and 2 percent by weight of p-toluene sulfonic acid.

The pigmented lacquer is applied with a doctor and then dried and crosslinked within 1 minute in a drying line at a linearly rising drying temperature (80° C. to 120° C.). After this period, it is no longer possible to detach the layer of pigmented lacquer by wiping over 100 times with a piece of nonwoven fabric soaked with acetone or methanol.

When writing on the drafting layer with pencil leads of increasing hardness (HB, 1H-9H), no scratching through the layer down to the polyester support is observed. From pencil hardness 6H onwards the layer surface is slightly damaged.

COMPARATIVE EXAMPLE

A plastic support pretreated as described in Example 1 is coated with a layer of pigmented lacquer comprising 42 percent by weight of aluminum silicate, 32 percent by weight of a carboxylated arcylate resin (Surcol® 836 W), 22 percent by weight of cellulose acetate propionate, 4 percent by weight of an aromatic copolyester (Dynapol® LH 812) and 2 percent by weight of p-toluene sulfonic acid.

The coating and drying conditions are comparable to those used in Example 1. In this case, however, the layer can be incipiently dissolved or detached by wiping over just once with a piece of nonwoven fabric soaked with acetone or methanol. In the writing test with pencil leads of increasing hardness a chip-like detaching of the layer of pigmented lacquer is observed from hardness 5H onwards, such that the bare polyester of the base film becomes visible. The layer surface is damaged already from pencil hardness 4H onwards.

EXAMPLE 2

A polyethylene terephthalate film provided with an adhesive layer and a layer of pigmented lacquer according to Example 1 is additionally coated with a top layer. As described in Example 5 of Eurpean Patent Application No. 0,119,464, the top layer comprises a polymer of vinyl acetate and an epichlorohydrin-modified polyamino/polyamide resins.

The suitability for writing on with pencil and the solvent resistance of the material of Example 1 are not adversely influenced by the presence of the top layer. In addition, the drafting material is rendered antistatic in this manner and has a surface resistance of $10^9$–$10^{10}$ Ω. Moreover, when india ink is used for writing on the material a very good stability of line widths is ensured. Edge sharpness of lines, wetting and ink adherence are excellent.

EXAMPLE 3

A film based on polyethylene terephthalate, which has been provided with an adhesive composition according to Example 1 is coated with the following layers of pigmented lacquer. The coating and drying conditions correspond to those used in Example 1 (numerical data in parts by weight).

|  | A | B | C |
| --- | --- | --- | --- |
| pigment | 40 | 40 | 40 |
| cellulose acetate propionate | — | 20 | 20 |
| Surcol ® 836 W | 45 | — | 33 |
| Dynapol ® LH 812 | 8 | 32 | — |
| hexamethoxymethylmelamine | 5 | 5 | 5 |
| p-toluene sulfonic acid | 2 | 2 | 2 |

The layers of pigmented lacquer are coated with a top layer as described in Example 2. Compared with materials prepared according to Example 2 the following differences are found:

in A: Hardness and solvent resistance of the layer of pigmented lacquer correspond to Example 1, however, the embedded pigments tend to travel to the layer surface.

in B: After the drying procedure an extremely brittle layer is obtained. When mechanically loaded, the layer, although well crosslinked, comes off from the support in large portions. In addition, the adhesion of the top layer is reduced, which becomes apparent by an insufficient adhesion of ink lines. When the drafting material is stored in daylight a clearly visible yellowing occurs, depending on the duration of storage.

in C: The layer shows a reduced solvent resistance. After wiping over 50 times only with a piece of nonwoven fabric soaked with acetone/methanol the layer of pigmented lacquer is detached.

EXAMPLE 4

A plastic support which has been pretreated as in Example 1 is coated with a layer of clear lacquer comprising 50 parts by weight of a carboxylated acrylate resin (Surcol® 836 W), 27 parts by weight of a polyvinyl acetate having an average molecular weight of approximately 5000 (Mowilith® 70, manufacturer Hoechst AG), 10 parts by weight of hexamethoxymethylmelamine, 5 parts by weight of an aromatic copolyester (Dynapol® LH 812) and 2 parts by weight of p-toluene sulfonic acid.

The coating and drying conditions correspond to those used in Example 1. The layer of clear lacquer is then coated with the top layer described in Example 2. The solvent resistance and the hardness of the layer of clear lacquer are comparable to the solvent resistance and hardness of the layer of pigmented lacquer used in Example 1. Acceptance of ink, writeability with ink and adherence of ink on the drafting layer are excellent.

EXAMPLE 5

A plastic support which has been pretreated on both sides as described in Example 1 is coated on both sides with a layer of clear lacquer comprising 70 parts by weight of a carboxylated acrylate resin (Surcol® 836 W), 20 parts by weight of hexamethoxymethylmelamine, 7 parts by weight of an aromatic copolyester (Dynapol® LH 812) and 2 parts by weight of p-toluene sulfonic acid. After drying, both sides are coated with a top layer according to Example 2. Also in this case, solvent resistance and hardness, antistatic properties and adherence of ink are excellent.

EXAMPLE 6

A layer of pigmented lacquer prepared as described in Example 1 is additionally coated with a two-component diazotype layer of the following composition:
10 ml of water,
100 ml of isopropanol,
5 ml of formic acid,
4 g of tartaric acid,
2 g of 2-($\beta$-hydroxyethoxy)-phenol,
2 g of 2,4-dihydroxy-N-(2-hydroxy-4-(4'-methyl)-phenylmercapto)-2,5-diethoxybenzene diazonium chloride (separated as the zinc salt)
The sensitized material can be exposed and developed in commercial copiers.

What is claimed is:

1. A drafting material which comprises a plastic support having, on at least one surface, an adhesive layer, a layer of lacquer and an antistatic top layer, wherein the layer of lacquer contains a combination of:
   (a) a linear aromatic polyester,
   (b) a carboxylated acrylate resin,
   (c) a cyclic acid amide, corresponding to the general formula I

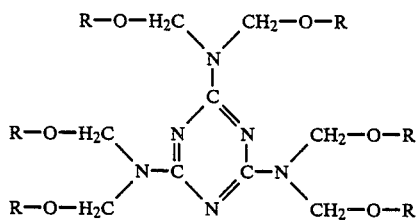

wherein R stands for an alkyl group having 1 to 4 carbon atoms, and
   (d) an acid catalyst.

2. A material as claimed in claim 1, wherein the layer of lacquer contains an inorganic pigment.

3. A material as claimed in claim 1, wherein the aromatic polyester used comprises a copolyester of isophthalic acid and terephthalic acid and at least one glycol.

4. A material as claimed in claim 1, wherein the carboxylated acrylate resin used comprises a resin having a viscosity ranging from about 700 to 750 mPa.s and an acid number between about 50 and 100.

5. A material as claimed in claim 1, wherein the cyclic acid amide used comprises hexamethoxymethylmelamine.

6. A material as claimed in claim 1, wherein the acid catalyst used comprises p-toluene sulfonic acid.

7. A material as claimed in claim 1, wherein the weight ratio between the carboxylated acrylate resin and the aromatic polyester is in the range from about 15:1 to 10:1.

8. A drafting material as claimed in claim 1, which is provided with a light-sensitive layer.

9. A drafting material as claimed in claim 3, wherein the weight ratio between the carboxylated acrylate resin and the aromatic polyester is in the range between about 15:1 to 10:1.

10. A drafting material as claimed in claim 4, wherein the weight ratio between the carboxylated acrylate resin and the aromatic polyester is in the range between about 15:1 to 10:1.

11. A drafting material as claimed in claim 1 comprising:
   (a) a copolyester of isophthalic acid and terephtalic acid and at least one glycol,
   (b) a carboxylated acrylate resin having a viscosity from about 700 and 750 mPa.s and an acid number from about 50 and 100,
   (c) hexamethoxymethylmelamine, and
   (d) p-toluene sulfonic acid.

12. A drafting material as claimed in claim 11, wherein the weight ratio between the carboxylated acrylate resin and the aromatic polyester is in the range from about 15:1 to 10:1.

13. A drafting material as claimed in claim 12, which is provided with a light sensitive layer.

* * * * *